(12) United States Patent
Gibson

(10) Patent No.: US 11,730,094 B2
(45) Date of Patent: Aug. 22, 2023

(54) FORESTRY MACHINE AND METHOD OF OPERATING FORESTRY MACHINE

(71) Applicant: KOMATSU LTD., Tokyo (JP)

(72) Inventor: Kendrick Michael Gibson, Chattanooga, TN (US)

(73) Assignee: KOMATSU LTD., Tokyo (JP)

( * ) Notice: Subject to any disclaimer, the term of this patent is extended or adjusted under 35 U.S.C. 154(b) by 719 days.

(21) Appl. No.: 16/804,273

(22) Filed: Feb. 28, 2020

(65) Prior Publication Data
US 2021/0267132 A1    Sep. 2, 2021

(51) Int. Cl.
| | |
|---|---|
| A01G 23/091 | (2006.01) |
| G05G 1/04 | (2006.01) |
| G05G 7/00 | (2006.01) |
| G05G 11/00 | (2006.01) |
| A01G 23/08 | (2006.01) |
| G05G 7/12 | (2006.01) |

(52) U.S. Cl.
CPC ........... *A01G 23/091* (2013.01); *A01G 23/08* (2013.01); *G05G 1/04* (2013.01); *G05G 7/00* (2013.01); *G05G 7/12* (2013.01); *G05G 11/00* (2013.01)

(58) Field of Classification Search
CPC .... A01G 23/08; A01G 23/081; A01G 23/083; A01G 23/091; A01G 23/095; G05G 1/04; G05G 7/00; G05G 7/12; G05G 11/00
See application file for complete search history.

(56) References Cited

U.S. PATENT DOCUMENTS

| | | | | |
|---|---|---|---|---|
| 5,746,261 A | * | 5/1998 | Bowling | A01G 23/067 144/334 |
| 6,408,906 B1 | * | 6/2002 | Moon | A01G 23/091 144/34.1 |
| 7,481,051 B2 | | 1/2009 | Bergquist | |
| 7,992,603 B2 | | 8/2011 | Pellymonter | |
| 2013/0333510 A1 | * | 12/2013 | Paakkinen | A01G 23/003 74/490.12 |

* cited by examiner

*Primary Examiner* — Matthew Katcoff
(74) *Attorney, Agent, or Firm* — Global IP Counselors, LLP

(57) ABSTRACT

A forestry machine includes a ground propulsion apparatus, a vehicle body supported by the ground propulsion apparatus, an operator seat disposed on the vehicle body, a first control lever operable by an operator sitting in the operator seat, a work implement including a saw, and a control circuit. The control circuit includes a first user input disposed on the first control lever. The first user input is operatively coupled to the work implement. Power to the saw is engaged upon the first user input being operated in combination with another operation. A method of operating a forestry machine includes operating a first user input disposed on the first control lever. Power is engaged to the saw in response to the first user input being operated in combination with another operation.

20 Claims, 9 Drawing Sheets

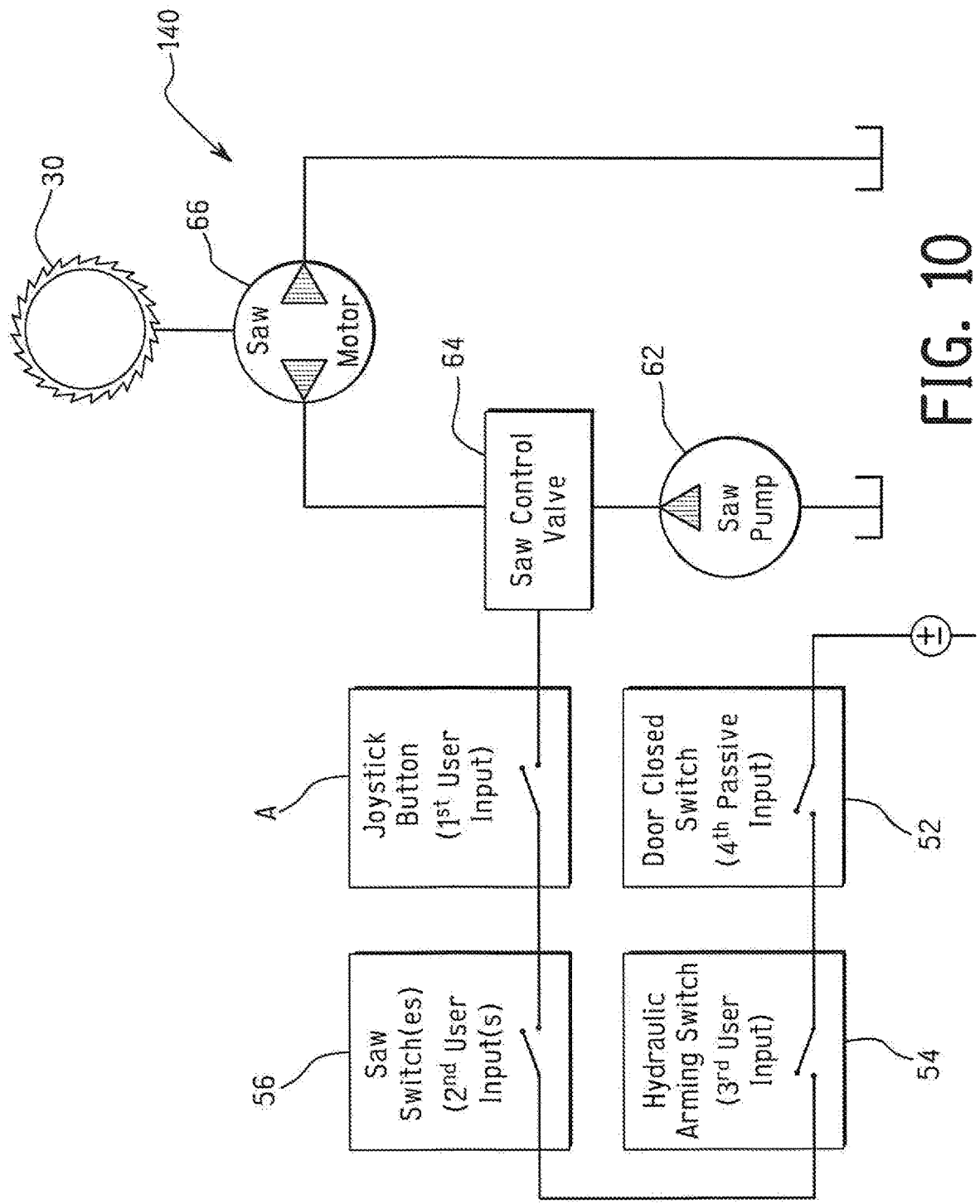

FORESTRY MACHINE AND METHOD OF OPERATING FORESTRY MACHINE

BACKGROUND

Field of the Invention

The present disclosure generally relates to a forestry machine and a method of operating a forestry machine. More specifically, the present disclosure relates to a forestry machine and a method of operating a forestry machine, which allows for engagement and disengagement of power to a saw in response to operation of a user input on a control lever.

Background Information

A forestry machine is used for logging or various other forestry purposes. On such a forestry machine at least one work implement is coupled to the vehicle body and/or chassis. Forestry machines include a ground propulsion apparatus that uses tracks or wheels to propel and/or steer the forestry machine. The tracks or wheels also serve to support the main body of the work vehicle. One example of a forestry machine is a feller buncher or harvester. On a harvester, the work implement typically includes a feller head with a spinning disc saw used to fell trees. A plurality of cutting teeth are peripherally mounted at circumferentially spaced intervals on the spinning disc saw. The disc saw is very heavy and acts as a flywheel. The spinning disc saw is spun up to operating speed by a hydraulic pump and motor circuit. The disc saw fells trees by kinetic energy, not hydraulic power. However, some hydraulic power is used to keep the disc saw spinning. The typical high-speed disc saw continuously rotates with the operator never turning it off. Currently, the saw control for a high speed disc saw felling head is located on the dash panel, or some other remote location requiring the operator to remove their hand(s) from the joystick control.

U.S. Pat. No. 7,992,603 discloses a saw speed readiness system for such a forestry machine. U.S. Pat. No. 7,481,051 discloses a tree feller management system.

SUMMARY

It has been discovered that if a tree is cut and the tree stays in contact with the spinning disc saw, power demand from the hydraulic pump will increase. This power demand utilizes power that could be used for other functions. If the saw pump could easily be shut off, the operator could use that saved power to more quickly and safely maneuver the cut tree. It has also been discovered that operators want to disable the saw easily if there is time between trees to save the power required to keep the saw spinning, e.g., so that the existing power can be used for traveling and preparing for the next tree.

Therefore, one object of the present disclosure is to provide forestry machine and method of operating a forestry machine, which allows the saw to be easily shut off to save power when possible.

Additionally, it has been discovered that if the operator wants to shut the high-speed disc saw off, the operator must remove one of their hands from the control joysticks. In this case, the operator control of the functions from that joystick will temporarily cease.

Therefore, another object of the present disclosure is to provide forestry machine and method of operating a forestry machine, which allows improved control of the machine and work implement by allowing the operator to easily control the high speed saw without removing their hands from the control levers because the operator would be able to maneuver a cut tree and or the forestry machine without letting go of a control lever.

It has been further discovered that if the saw is more easily shut off, for example only to move from a felled tree to a next tree, it is desirable for the operator to easily turn the high speed disc saw back on and without removing hand(s) from the control joystick(s).

Therefore, another object of the present disclosure is to provide forestry machine and method of operating a forestry machine, which allows the operator to easily turn the high speed disc saw back on without removing hand(s) from the control lever(s).

It has been further discovered that allowing the operator to more easily turn the saw on and off could result in inadvertent activation of the high speed disc saw.

Therefore, another object of the present disclosure is to provide one or more additional operating conditions that must be satisfied before the saw control can be easily activated, in order to control, limit, and even prevent inadvertent activation of the high speed disc saw.

In view of the state of the known technology and in accordance with a first aspect of the present disclosure, a forestry machine includes a ground propulsion apparatus, a vehicle body supported by the ground propulsion apparatus, an operator seat disposed on the vehicle body, a first control lever operable by an operator sitting in the operator seat, a work implement movably attached relative to the vehicle body and including a saw, and a control circuit. The control circuit includes a first user input disposed on the first control lever, and a second input operatively coupled to the work implement. The first user input is operatively coupled to the work implement. Power to the saw is engaged upon the first user input and the second input both being operated.

In accordance with a second aspect of the present disclosure, the forestry machine according to the first aspect further includes a dashboard supported by the vehicle body, the second input being disposed on the dashboard.

In accordance with a third aspect of the present disclosure, the forestry machine according to the second aspect is configured so that the second input includes a pair of manual inputs, and power to the saw is engaged upon the first user input and both the manual inputs being operated.

In accordance with a fourth aspect of the present disclosure, the forestry machine according to the first aspect further includes a second control lever, the second input being disposed on the second control lever.

In accordance with a fifth aspect of the present disclosure, the forestry machine according to the first aspect is configured so that the second input is disposed on the first control lever, and the first user input and the second input are disposed at different positions on the first control lever.

In accordance with a sixth aspect of the present disclosure, the forestry machine according to the first aspect is configured so that the second input includes a passive input indirectly operable by the operator.

In accordance with an seventh aspect of the present disclosure, the forestry machine according to the sixth aspect further includes a cab supported on the vehicle body, the cab having a door openable to allow the operator to enter and exit the cab. The passive input is a door closed detector.

In accordance with an eighth aspect of the present disclosure, the forestry machine according to the first aspect is configured so that power to the saw is disengaged in response to a single operation.

In view of the state of the known technology and in accordance with a ninth aspect of the present disclosure, a forestry machine includes a ground propulsion apparatus, a vehicle body supported by the ground propulsion apparatus, an operator seat disposed on the vehicle body, a first control lever operable by an operator sitting in the operator seat, a work implement movably attached relative to the vehicle body and including a saw, and a control circuit. The control circuit includes a first user input disposed on the first control lever. The first user input is operatively coupled to the work implement to engage and disengage power to the saw in response to operation of the first user input. Power to the saw is engaged upon multiple operations of the first user input within a predetermined time period being performed.

In accordance with a tenth aspect of the present disclosure, the forestry machine according to the ninth aspect is configured so that power to the saw is disengaged in response to a single operation.

In view of the state of the known technology and in accordance with an eleventh aspect of the present disclosure, a method of operating a forestry machine including a saw and a first control lever operable by an operator sitting in an operator seat is provided. The method includes operating a first user input disposed on the first control lever, and operating a second input. Power is engaged to the saw in response to the first user input and the second input both being operated.

In accordance with a twelfth aspect of the present disclosure, the method according to the eleventh aspect is configured so that the operating the second user input includes operating an input disposed on a dashboard of the forestry machine.

In accordance with a thirteenth aspect of the present disclosure, the method according to the twelfth aspect is configured so that the operating the second user input disposed on the dashboard includes operating a pair of manual inputs.

In accordance with a fourteenth aspect of the present disclosure, the method according to the eleventh aspect is configured so that the operating the second user input includes operating an input disposed on a second control lever of the forestry machine.

In accordance with a fifteenth aspect of the present disclosure, the method according to the eleventh aspect is configured so that the operating the second user input includes operating an input disposed on the first control lever at a different position from the first user input.

In accordance with a sixteenth aspect of the present disclosure, the method according to the eleventh aspect is configured so that the operating the second user input includes operating a passive input indirectly operable by the operator.

In accordance with an seventeenth aspect of the present disclosure, the method according to the sixteenth aspect is configured so that the operating the passive input includes operating a door closed detector that indicates whether a door of a cab of the forestry machine is open or closed.

In accordance with an eighteenth aspect of the present disclosure, the method according to the eleventh aspect further includes performing a single operation to disengage power to the saw.

In accordance with am nineteenth aspect of the present disclosure, the method according to the eleventh aspect is configured so that the operating the first user input includes multiple operations of the first user input within a predetermined time period being performed to engage power to the saw.

In accordance with a twentieth aspect of the present disclosure, the method according to the nineteenth aspect further includes performing a single operation to disengage power to the saw.

Any combinations of the first to tenth aspects can be combined. Likewise, any combinations of the eleventh to twentieth aspects can be combined. However, if multiple second inputs are present, the inputs can be considered second, third, and fourth inputs, etc.

Also, other objects, features, aspects and advantages of the disclosed work vehicle will become apparent to those skilled in the work vehicle field from the following detailed description, which, taken in conjunction with the annexed drawings, discloses exemplary embodiments of the work vehicle.

BRIEF DESCRIPTION OF THE DRAWINGS

Referring now to the attached drawings which form a part of this original disclosure:

FIG. 10 is a simplified schematic illustration of a control circuit including part of a hydraulic circuit but no electronic controller in accordance with a second embodiment.

DETAILED DESCRIPTION OF THE EMBODIMENT(S)

A selected embodiment will now be explained with reference to the drawings. It will be apparent to those skilled in the art from this disclosure that the following description of the embodiment is provided for illustration only and not for the purpose of limiting the invention as defined by the appended claims and their equivalents.

Figure 1:
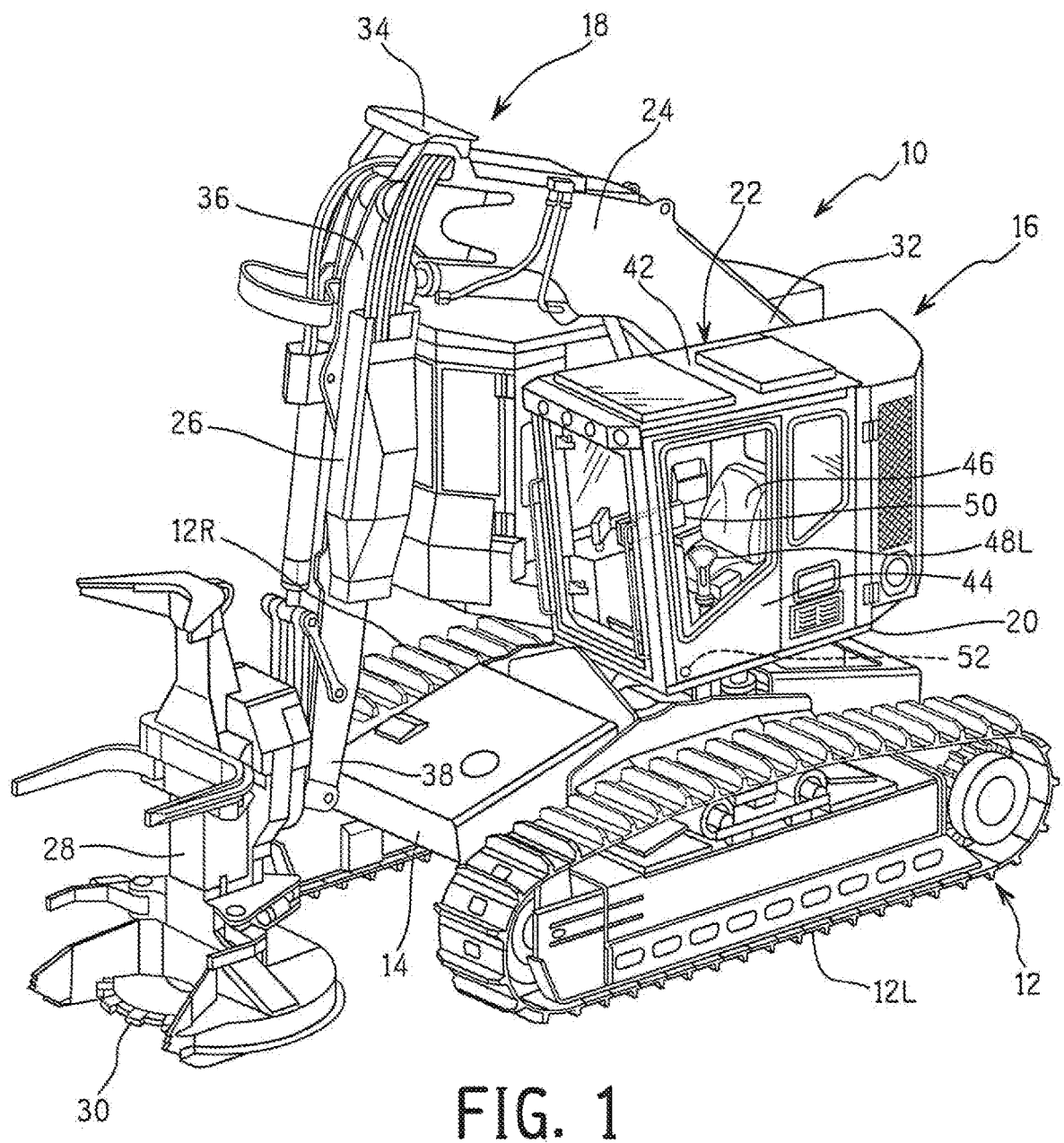
FIG. 1 is a left side perspective view of a forestry machine in accordance with a first embodiment.
Figure 2:
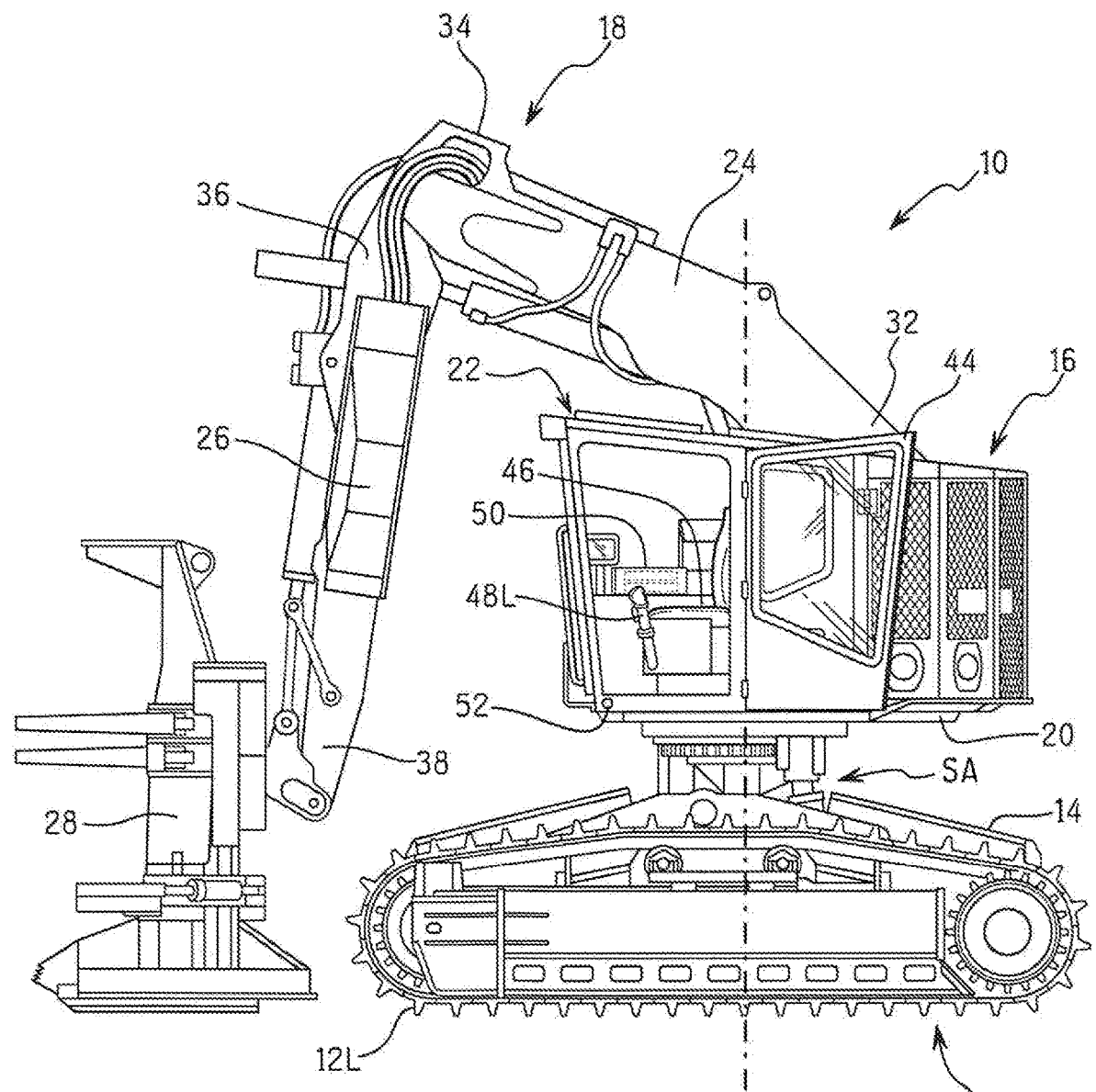
FIG. 2 is an enlarged left side elevational view of the forestry machine illustrated in FIG. 1.
Figure 3:
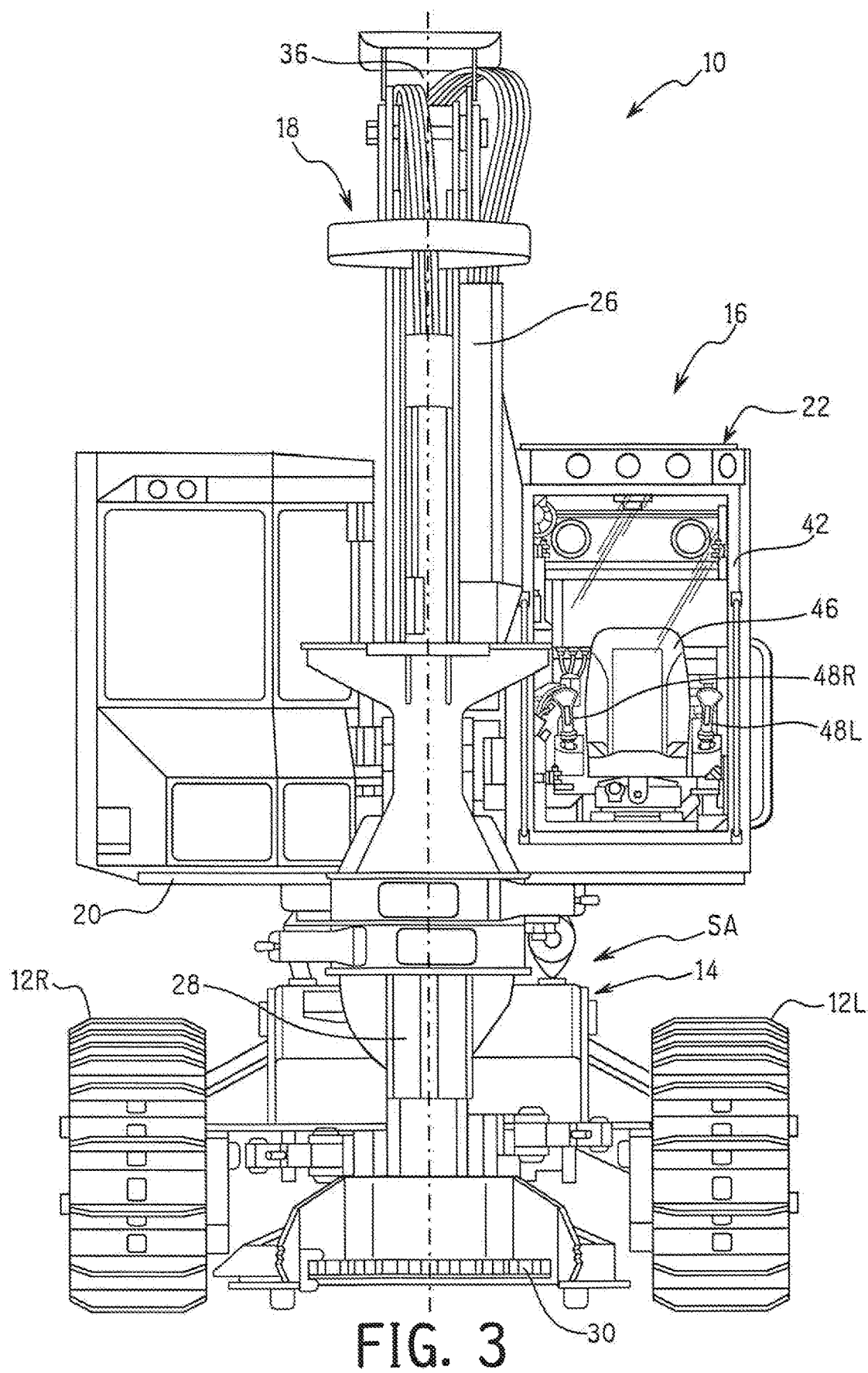
FIG. 3 is a further enlarged front elevational view of the forestry machine illustrated in FIGS. 1-2.

Referring initially to FIGS. 1-3, a forestry machine 10 is illustrated in accordance with one illustrated embodiment.

As explained below, the forestry machine 10 has improved operation of a work implement 18 mounted thereto. In the illustrated embodiment, the forestry machine 10 is a tree harvester, such as a short tail tracked harvester. While it will be apparent to those skilled in the art from this disclosure that certain aspects may be particularly beneficial in the illustrated tree harvester, it will also be apparent that many of the aspects of the forestry machine 10 can be applied to other types of forestry machines. For example, the present disclosure may be applicable to wheeled forestry machines, long tailed tree harvesters, or any other forestry machine in which it is desired for a saw to be easily operated by the operator.

In the illustrated embodiment, the forestry machine 10 includes a ground propulsion apparatus 12, a chassis 14, a vehicle body 16, and the work implement 18. The work implement 18 is controlled by a control circuit 40 (FIG. 7) in accordance with the present disclosure. More specifically, the work implement 18 includes a saw 30 the is controlled by the control circuit 40. The control circuit 40 enables the saw 30 to be easily turned on and off by the operator. The control circuit 40 is also configured to prevent inadvertent operation of the saw 30, as explained below in more detail.

In the illustrated embodiment, the ground propulsion apparatus 12 has a pair of tracks 12L and 12R used to propel and maneuver the forestry machine 10 in a conventional manner. However, it will be apparent to those skilled in the work vehicle field from this disclosure that the present disclosure is also applicable the wheeled work vehicles in which the tracks are replaced by wheels or some other means of moving the forestry machine 10 along the ground. The ground propulsion apparatus 12 supports the chassis 14, which supports the vehicle body 16. The vehicle body 16 is pivotally supported by and attached to the ground propulsion apparatus 12 via the chassis 14. The work implement 18 is movably attached to the vehicle body 16. The vehicle body 16 includes a deck 20 on which an operator cab 22 is disposed and from which an operator can operate the forestry machine 10. While the drawing figures generally illustrate the forestry machine 10 from a left side, the right side of the work vehicle is similarly configured and is substantially a mirror image of the left side.

The ground propulsion apparatus 12 of the illustrated embodiment includes an undercarriage and other conventional parts that enable the work vehicle 10 to move along a ground surface. In the illustrated embodiment, the ground propulsion apparatus 12 includes the left or first track 12L and the right or second track 12R. The first and second tracks 12L and 12R are arranged to contact the ground surface. The first and second tracks 12L and 12R are driven by, for example, a hydraulic motor (not shown). In the illustrated embodiment, the forestry machine 10 is a short tail tracked harvester in that the rear end of the vehicle body 16 does not extend beyond the first and second tracks. In other words, a rearmost portion of the vehicle body 16 is positioned forward with respect to a rearmost end of the first and second tracks 12L and 12R when the vehicle body 16 is oriented facing forward without a swing angle.

As shown in FIG. 1, the chassis 14 is basically a frame to which the ground propulsion apparatus 12 is attached. The chassis 14 is supported with respect to the ground surface by the ground propulsion apparatus 12 and serves to support the vehicle body 16 with respect to the ground propulsion apparatus 12. More specifically, the chassis 14 is configured to support a swing apparatus SA that supports the vehicle body 16 (e.g., the deck 20). The swing apparatus SA includes a swing bearing and a swing motor (not shown). In the illustrated embodiment, the swing motor, the swing bearing, and the vehicle body 16 are coupled together such that the vehicle body 16 can be rotated about a vertical swing axis by the swing motor. The vehicle body 16 is supported on the swing apparatus SA such that the vehicle body 16 is swingably mounted to the chassis 14 about the vertical swing axis. Although the illustrated embodiment is provided with the swing apparatus SA, the disclosure is not limited to a work vehicle that includes a swing apparatus. The vehicle body 16 can be non-rotatable or fixed with respect to the chassis 14. In addition, in the illustrated embodiment, the swing apparatus SA is a leveling swing apparatus SA. However, it will be apparent to those skilled in the art from this disclosure that the swing apparatus SA can be non-leveling.

Referring still to FIGS. 1-3, in the illustrated embodiment, the work implement 18 includes a boom 24, an arm 26 and an attachment or work tool 28. In the illustrated embodiment, the work tool 28 is a harvester head/attachment that includes a high-speed disc saw 30. The boom 24 has a vehicle attachment end 32 and an arm attachment end 34. The vehicle attachment end 32 is movably attached to at least one of the chassis 14 and the vehicle body 16. The arm attachment end 34 attached to the arm 18. The arm 26 has a boom attachment end 36 and a tool attachment end 38. The boom attachment end 36 is pivotally coupled to the arm attachment end 34. The work tool 28 is coupled to the tool attachment end 38 of the arm 26. A pivotal connection attaches the boom 24 to the arm 26 in a conventional manner, such that the forestry machine 10 can be operated with the boom 24 and the arm 26 in a plurality of orientations. The boom 24 and the arm 26 are operated using a hydraulic system in a conventional manner.

The vehicle body 16 includes the cab 22 as well as numerous other conventional components such as an engine compartment containing an engine, a main hydraulic housing containing the main vehicle hydraulics, and a counterweight supported on the deck 20. The deck 20 is a strong rigid plate shaped member constructed of for example steel plate material. The deck 20 can be constructed of multiple parts. The deck 20 is attached to the swing apparatus SA. In addition, the work implement 18 is movable attached to the deck 20 adjacent the cab 22.

The operator cab 22 includes a box shaped structure 42, a door 44, an operator's seat 46, a left (first or second) control lever or joystick 48L, a right (second or first) control lever or joystick 48R and a dashboard 50 including various operating members useable by the operator to operate the forestry machine 10. In the illustrated embodiment, left and right control joysticks 48L and 48R are illustrated. However, these are merely two examples of possible control levers in accordance with the present disclosure. It will be apparent to those skilled in the art from this disclosure that other types of control levers can be used as needed and/or desired. The box shaped structure 42 is constructed of rigid plate material and can be constructed of several pans attached to each other. The box shaped structure 42 has various cutouts with windows mounted therein, and a door opening with the door 44 pivotally mounted therein in a conventional manner. The door 44 is openable and closable to allow an operator to enter and exit the cab 22 in a conventional manner.

A door open/close detector or switch 52 is a passive input arranged to detect whether the operator door 44 is open or closed. The door open/close detector or switch 52 is not directly operated by the user. Rather, the movement of the door 44 causes the door open/close detector or switch 52 to open or close. The door open/close detector or switch 52 is merely one example of a passive input in accordance with the present disclosure. However, it will be apparent to from this disclosure that other passive inputs are possible. One other example of a passive input is a seat occupancy detector. The saw 30 as well as other operations of the forestry machine 10 are inactive when the door 44 is open. The dashboard 50 is mounted to an interior surface of the box shaped structure 42 at a location where the operator can view the dashboard 50 and reach the dashboard 50 with at least one hand.

In the illustrated embodiment, numerous operating members (user inputs) are provided to be operated by hand, and pedal type operating members (not shown) are provided on the floor to be operated by foot. There are no particular limitations on the arrangement and type of operating members provided in the operator cab 22. The foot pedals can be used to control the ground propulsion apparatus 12 to control movement of the overall position of the forestry machine 10 itself over the terrain. The operating members on the dashboard 50 are preferably arranged in positions where they are easy for the operator to access and do not obstruct the operators field of view. In the illustrated embodiment, as one example, the dashboard 50 is positioned to the right of the operator. In the illustrated embodiment, the operating members on the dashboard 50 are shown as physical buttons, switches, knobs, etc. However, it will be apparent to those of ordinary skill in the art that one or more touch screens can be used instead of the physical buttons, switches, knobs, etc. or in addition to (i.e., to provide redundant control) the physical buttons, switches, knobs, etc.

Referring now to FIGS. 1-5, the control joysticks 48L and 48R will now be explained in more detail. The control joysticks 48L and 48R are identical, except for where they are mounted within the cab 22. The control joysticks 48L and 48R are movable to control various components of the forestry machine 10. In addition, each of the control joysticks 48L and 48R includes a plurality of buttons A-F and a trigger G. The joysticks 48L and 48R are programmable to control various functions of the forestry machine. In particular, movement directions of each control joysticks 48L and 48R, e.g., front, back left and right, can be programmed so that a certain function is carried out in response to the movement. In addition, the plurality of buttons A-F and a trigger G on each of the control joysticks 48L and 48R are programmable to carry out certain functions in response to actuation thereof. The joysticks 48L and 48R are merely examples of control joysticks. It will be apparent to those skilled in the art from this disclosure that the control joysticks 48L and 48R can have more or fewer buttons and or triggers and/or the triggers can be eliminated, if needed and/or desired.

Figure 4:
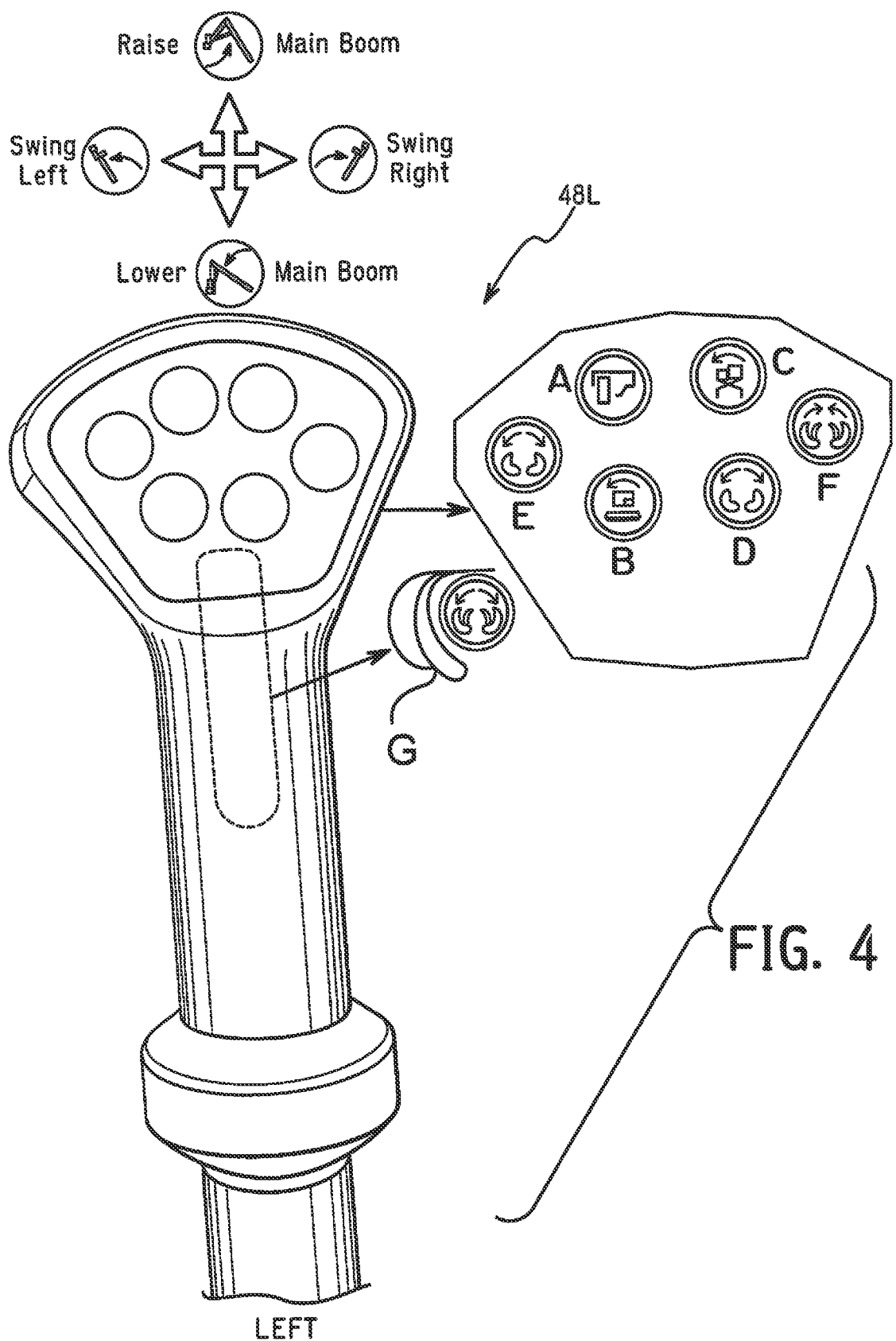
FIG. 4 is a operator view of a first (right or left) control lever of the forestry machine illustrated in FIGS. 1-3, with buttons A-F (first or second user inputs) enlarged to show an example button program layout.

Referring now to FIG. 4, one example of how the left control joystick can be programmed is illustrated. First, one example of movement directions of the control joystick 48L will be discussed. Moving the control joystick 48L forward raises the main boom 24, while moving the control joystick 48L backward lowers the main boom 24. Moving the control joystick 48l left causes the body 16 with the work implement 18 to swing left, while moving the control joystick 48L to the right causes the body 16 with the work implement 18 to swing right. The buttons can A-F and trigger G can be programmed as follow: A=Saw Cut ON/OFF, B=Cab Level Back, C=Cab level left, D=Clamp arms open. E=Clamp Arms Open, F=Clamp and Accumulator Close, G=Clamp and Accumulator Open. Clamp arms can be used to grab individual trees for cutting in a conventional manner. The accumulator can be used when cutting multiple trees to accumulate the trees in an accumulator pocket in a conventional manner. The leveling buttons can be used to level the vehicle body 16. Because the forestry machine 10 often operates on uneven terrain, levelling can make it easier for the operator to harvest trees. Two functions have redundant programming in this example. This is not necessary. However, there are enough buttons and triggers so that the control joystick 48L has seven possible programmed functions, even if all might not be needed. It will be apparent that other programming schemes are possible. In fact, the variety of programming schemes is only limited by the preferred button layout of each particular operator.

Figure 5:
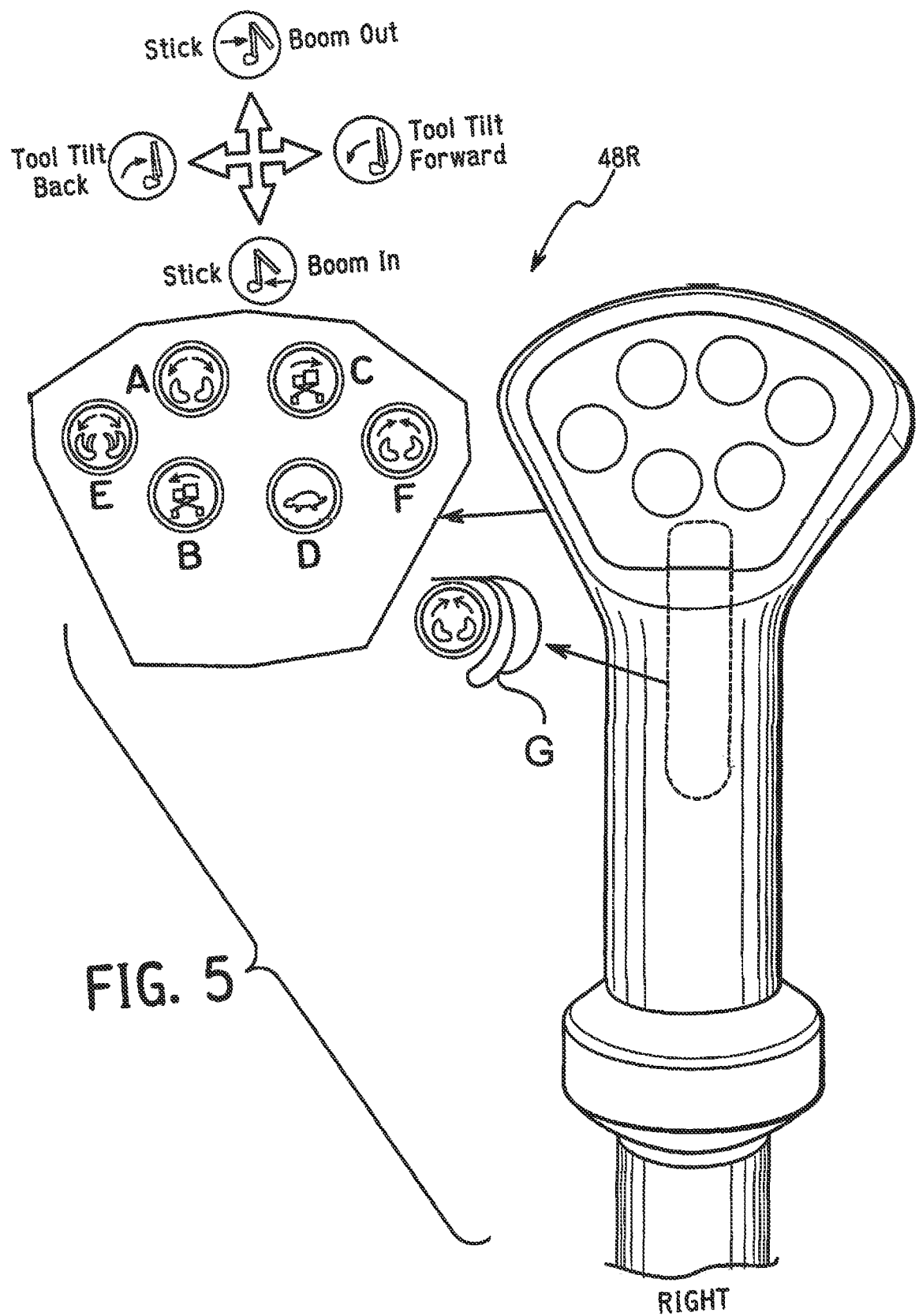
FIG. 5 is an operator view of a second (left or right) control joystick of the forestry machine illustrated in FIGS. 1-3, with buttons A-F (second or first user inputs) enlarged to show an example button program layout.

Referring to FIG. 5, one example of how the right control joystick can be programmed is illustrated. First, one example of movement directions of the control joystick 48R will be discussed. Moving the control joystick 48R forward sticks the arm 26 out, while, moving the control joystick 48R backward sticks the arm 26 in. Moving the control joystick 48R left causes the work tool 28 to tilt back, while moving the control joystick 48R to the right causes the work tool 28 to tilt forward. The buttons can A-F and trigger G can be programmed as follow: A=Clamp Arms Open, B=Cab Level Left, C=Cab level Right, D=Track Shift, E=Clamp and Accumulator Open, F=Clamp Arms Close, G=Clamp Arms Close. Track shift is used when it is desired to move the forestry machine along a linear path, i.e., the track shift button can be used to keep the travel along the desired track in a conventional manner. Two functions have redundant programming in this example. This is not necessary. However, there are enough buttons and triggers so that the control joystick 48R has seven possible programmed functions, even if all might not be needed. It will be apparent that other programming schemes are possible. In fact, the variety of programming schemes is only limited by the preferred button layout of each particular operator.

Figure 6:
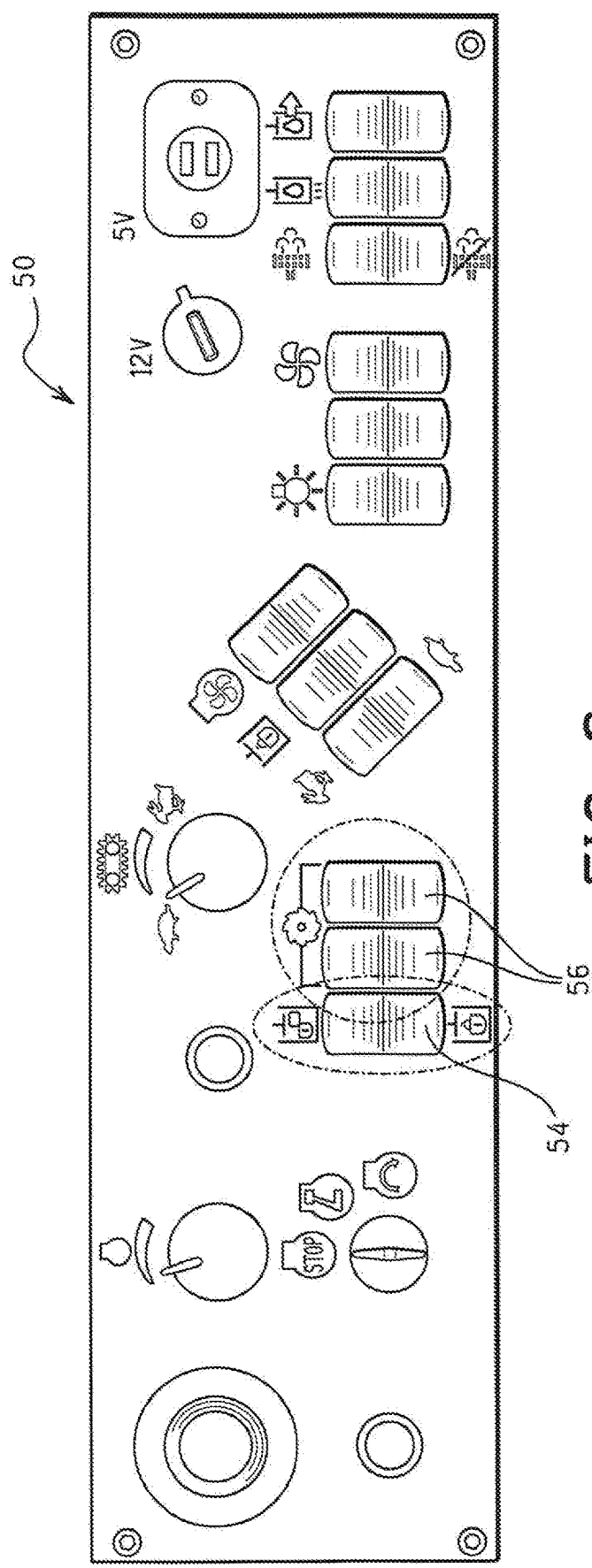
FIG. 6 is an enlarged elevation view of a dash panel of a dashboard of the forestry machine illustrated in FIGS. 1-3, with a manual hydraulic arming switch (third user input) circled in phantom lines, and with a pair of manual saw switches (second user input) circled in phantom lines.

Referring now to FIG. 6, the dashboard 50 will now be explained in more detail. The dashboard 50 includes various conventional controls such as for staring the engine, lights, heating and ventilation, throttle, choke, emergency stop, indicator lights, display(s), etc. in a conventional manner. Since these elements are conventional they will not be discussed and/or illustrated herein. In addition, the dashboard 50 includes a hydraulic arming switch 54 and a pair of saw switches 56 in accordance with the present disclosure. As mentioned above, the forestry machine 10 includes an engine (not shown) and a main hydraulic circuit (not shown). The engine drives the main hydraulic circuit in order to control various features of the forestry machine 10 in a conventional manner. The hydraulic arming switch 54 arms the main hydraulics of the forestry machine 10 in a conventional manner. In the illustrated embodiment there are two saw switches 56, which both must be activated in order for the saw button A on the control joystick 48L to be operable as explained below. However, it will be apparent to those skilled in the art from this disclosure that a single saw switch 56 can be used instead of a pair, if needed and/or desired. However, a pair of switches 56 reduces the possibility of inadvertent operation of the saw switch(es) 56 by requiring simultaneous operation of two switches. A single switch may be more easily operated unintentionally. A machine controller 60 (only shown in FIGS. 7-8) can be disposed behind the dashboard 50 or in any other location where the machine controller 60 can be connected to or communicate with the control joysticks 48L and 48R as well as the parts of the dashboard 50.

Figure 7:
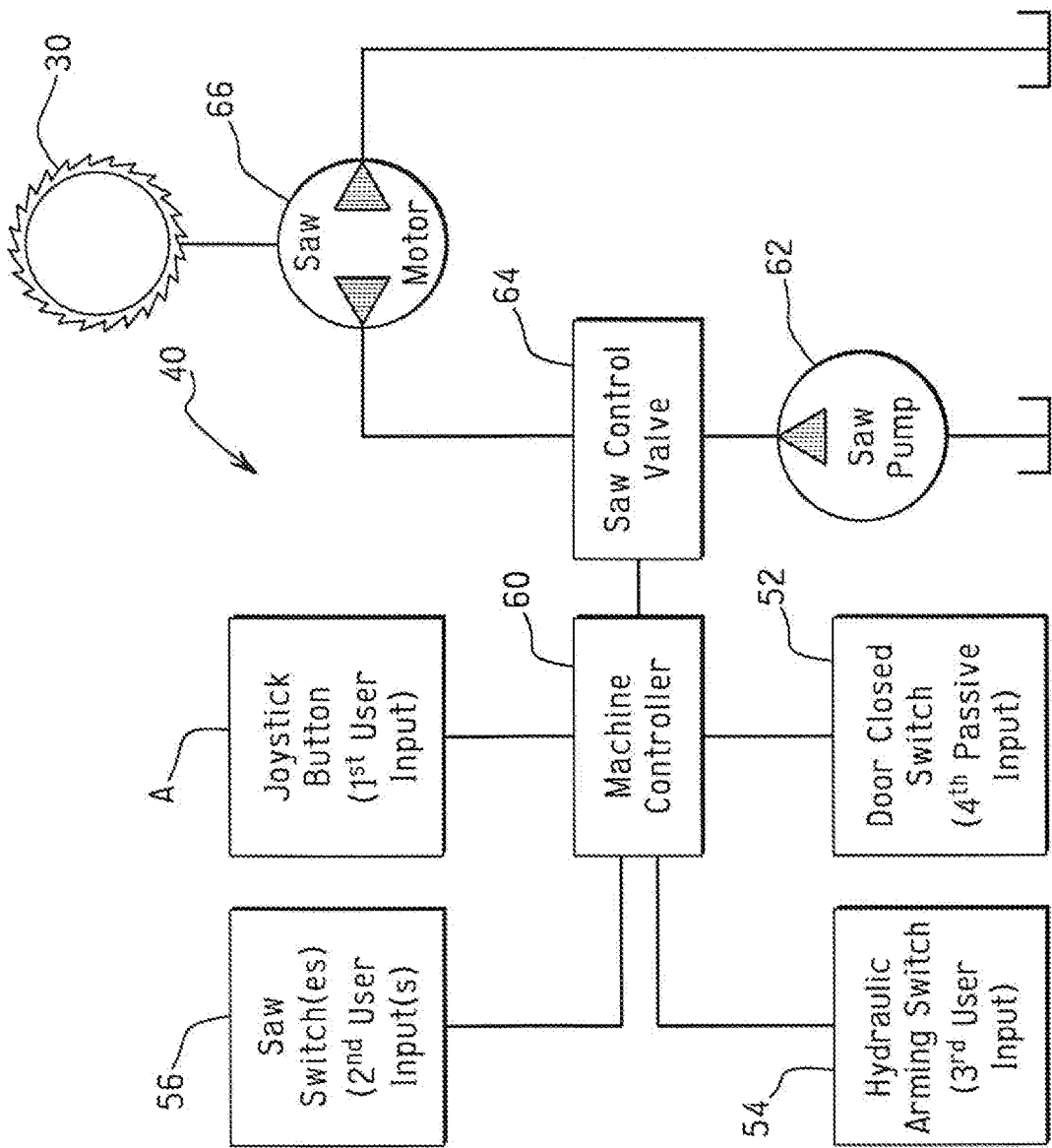
FIG. 7 is a simplified schematic illustration of a control circuit including an electronic controller and part of a hydraulic circuit of the forestry machine illustrated in FIGS. 1-6.

Referring now to FIG. 7, the control circuit 40 will now be explained in more detail. Although the main hydraulic circuit is not illustrated in detail herein, a portion thereof supplying hydraulic fluid to the saw 30 is shown in FIG. 7, and forms part of the control circuit 40. This portion of the hydraulic circuit includes a saw pump 62, a saw control valve 64, and a saw motor 66. The control circuit 40 further includes a machine controller 60. The control circuit 40 further includes the machine controller 60 as well the button A (programmed as the saw cut ON/OFF button in the illustrated example), the saw switches 56 (a second user input), the hydraulic arming switch 54 (a third user input) and the door open/closed detector or switch 52 (a fourth passive input). The terms "second" input, "third" input" and "fourth" input can be used interchangeably. However, these terms are used in the above manner herein for the sake of convenience. In addition, in the illustrated embodiment, the button A (programmed as the saw cut ON/OFF button in the illustrated example), the saw switches 56 (a second user input), the hydraulic arming switch 54 (a third user input) and the door open/closed detector or switch 52 (a fourth passive input) are all preferably present. However, one or more of these inputs can be eliminated if needed and/or desired. Regardless, the machine controller 60 controls the saw control valve 64 based on the signals received from these inputs, as explained below in more detail. It will be apparent to those skilled in the art from this disclosure that any of the buttons A-F and trigger G of the control joysticks 48L and 48R (first and/or second user inputs) can be considered parts of the control circuit if programmed to control the saw 30 (e.g., as explained in example modification(s) below). Note that either of the control joysticks 48L and 48R can be considered a first or second.

The saw pump 62 provides flow to turn the saw motor 66. The saw motor 66 then spins the high speed disc saw 30. If an alternative saw is provided such as a bar saw (chain saw, not shown) is used, the saw pump 62 can turn the saw motor 66, which turns a gear (not shown) that moves the chain along the bar (not shown). In either case, the saw pump 62 only provides flow to the saw motor 66 when the saw control valve 64 is open. In this embodiment, the saw control valve 64 is open when the saw button A (first user input) is turned on and certain other conditions have been met by the other user inputs (second-fourth user inputs) as explained below. The saw pump 62 is always turning, but it is not providing flow and all flow is also blocked by the saw control valve 64 when the saw control valve 64 is closed.

The saw pump 62 and/or the saw motor 66 can be connected to the machine controller. However, it is not necessary, as illustrated in FIG. 7. For example, the pump 62 could have, as some pumps have, electronic inputs to change the displacement of the pump 62, or outputs that may tell pump pressure or angle of the swash plate (not shown). The motor 66 could have a speed sensor to tell the controller 60 the saw speed, but it is not required. In other words, such features are optional, and thus, are not discussed or illustrated in further detail herein. The saw pump 62 and the saw motor 66 are conventional, and thus, will not be explained and/or illustrated herein. The input to the saw control valve 64 is a simple on/off solenoid, but it allows for the pump 62 to generate its own Load Sense signal to bring the pump 62 onto stroke. There is also a safety relief (not shown) in the valve 64. This saw control valve 64 is conventional. However, the saw control valve 64 is controlled by the machine controller 60 in response to the signals received from the user inputs as explained herein, i.e., the saw control valve 64 is opened and closed to engage power and disengage power to the saw 30 in accordance with the present disclosure.

Figure 8:
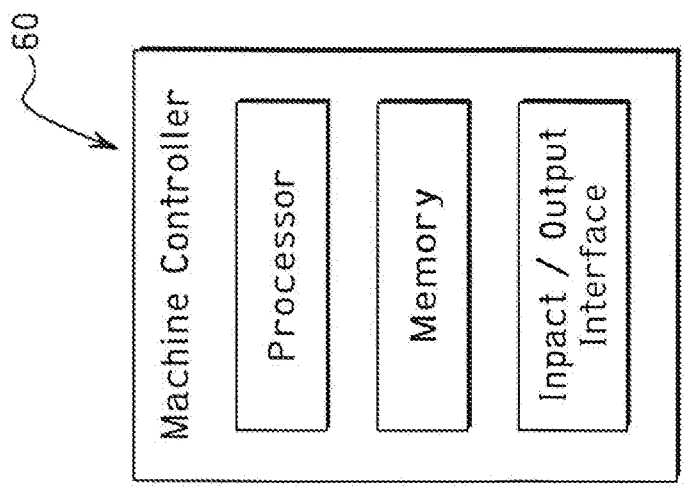
FIG. 8 is a simplified schematic illustration of the machine controller of the control circuit illustrated in FIG. 7.

Referring now to FIG. 8, the machine controller 60 in this embodiment is an electronic controller. The electronic controller 60 is preferably a microcomputer or central processing unit (CPU) that includes at least one processor, at least one computer storage device (i.e., computer memory device (s)), and an input/output interface that can receive information from other components including the first-fourth inputs, and send operating signals to other components including the saw control valve 64. The electronic controller 60 is formed of one or more semiconductor chips that are mounted on a circuit board. The electronic controller 60 can be one or more integrated circuits having firmware for causing the circuitry to complete the activities described herein. Of course, any number of other analog and/or digital components capable of performing the below described functionality can be provided in place of, or in conjunction with the below described electronic controller 60. The term "electronic controller" as used herein refers to hardware that executes a software program, and does not include a human.

The memory is any computer storage device or any non-transitory computer-readable medium with the sole exception of a transitory, propagating signal. For example, the memory can include nonvolatile memory and volatile memory, and can includes a ROM (Read Only Memory) device, a RAM (Random Access Memory) device, a hard disk, a flash drive, etc. The memory or computer storage device is configured to store settings, programs, data, calculations and/or results of the processor(s) of the electronic controller 60.

The user operable input(s), user inputs and passive input are not limited to the ones shown and described herein, and can include, for example, a button or buttons, a switch or switches, a lever or levers, a dial or dials, a knob or knobs, and/or one or more touch screens. For example, the saw button A could be a physical switch that either latches or toggle, instead of a button. The user operable input(s) can be mounted on a suitable portion of the vehicle as explained and/or illustrated herein. The term "user operable input" is a device that is manually operated by a person. The term "user operable input" as used herein do not include a human. A "passive input" is indirectly operated by a human and does not include a human. The passive input illustrated herein is the door open/close detector or switch 52.

The term "detector" as used herein refers to a hardware device or instrument designed to detect the presence of a particular object or substance and to emit a signal in response. The term "detector" as used herein does not include a human.

Although in the illustrated embodiment, the user inputs and saw control valve 64 are illustrated is electrically connected (wired) together for communication, other communication device(s) can be used. A communication device is a hardware device capable of transmitting an analog or digital signal over a communication wire, or wirelessly. One example of a communication device is a computer Modem, which is capable of sending and receiving a signal to allow computers to talk to other computers over the telephone. Other examples of communication devices include a NIC (network interface card), Wi-Fi devices, and access points.

The term "wireless communication device" as used herein includes a receiver, a transmitter, a transceiver, a transmitter-receiver, and contemplates any device or devices, separate or combined, capable of transmitting and/or receiving wireless communication signals, including shift signals or control, command or other signals related to some function of the component being controlled. The wireless communication signals can be radio frequency (RF) signals, ultra-wide band communication signals, or Bluetooth® communications or any other type of signal suitable for short range wireless communications. The saw control valve 64 could also use a hydraulic pilot signal to shift the start solenoid. Another type of electrical signal that could be used is CAN.

Figure 9:
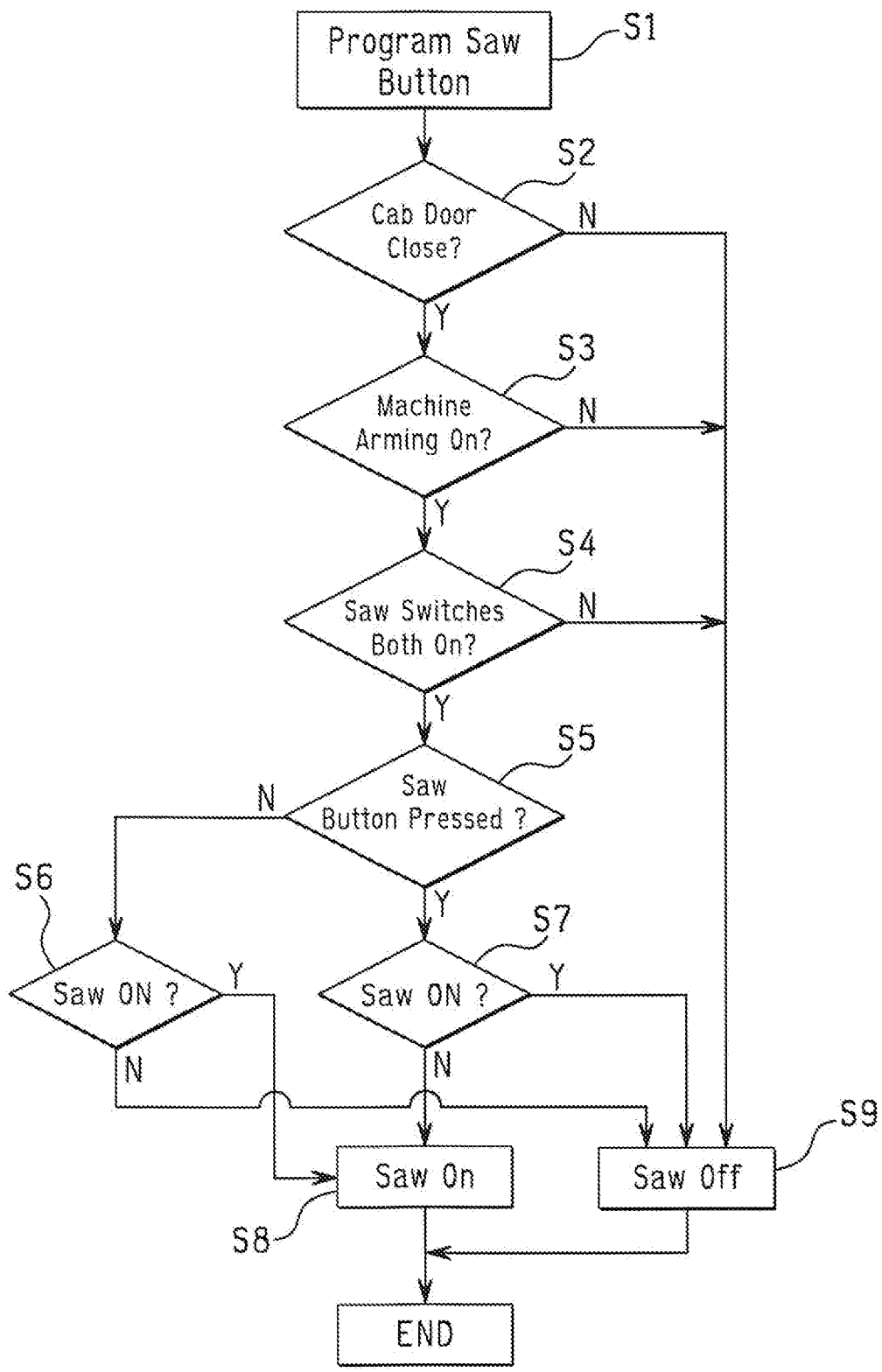
FIG. 9 is flow chart illustrating saw control logic of the saw control circuit of the forestry machine illustrated in FIGS. 7-8.

Referring now to FIG. 9, the programming of the machine controller 60 will now be explained. The machine controller 60 has a control program installed thereon to control the saw 30 using the user inputs, as now explained. The buttons/triggers A-G on the control joysticks 48L and 48R arrive from the manufacturer unprogrammed. The operator before a first use must first program these buttons/triggers. The possibilities of the button/trigger programming are virtually limitless since there are fourteen user inputs combined on the two control joysticks 48L and 48R. One example of a programming scheme is illustrated in FIGS. 4-5 and discussed above. However, this is merely one example of a programming scheme. The functions of these buttons/triggers A-G are conventionally programmed, except for the programming of the saw button A on the left control joystick 48L. In the past, no such button has been available on either joystick 48L or 48R. While the button A on the left control joystick 48L is programmed as the saw button, any of the buttons/triggers A-G can be programmed as a saw button on either joystick 48L or 48R. In addition, more than one saw button can be provided. For example, each of the control joysticks 48L and 48R can have one of the buttons/triggers A-G programmed as a saw button to engage and disengage power to the saw in response to activation thereof. However, in this embodiment, once other conditions are met, only a single user input (saw button, e.g., button A) on one of the control joysticks 48L and 48R has to be activated to engage and disengage power to the saw 30.

As mentioned above, in the illustrated embodiment, certain conditions have to be met before the saw button A turns on the saw 30. First, as mentioned above, in a step S1 the joystick saw button A (or any other of the buttons/triggers A-G) should be programmed to be a saw button. For the sake of convenience, in this embodiment, it will be assumed that only the button A on the joystick 48L is a saw button (first user input). Of course, it is also possible that a saw button, such as button A is preprogrammed or has a fixed function. The other buttons/triggers A-G are also programmed but to control the other traditional functions in a conventional manner.

Second, in a step S2 the machine controller 60 will determine if the operator cab door 44 is open or closed based on a signal received from the door open/close detector 52 (one example of a fourth, passive, input). The door detector 52, alternatively, could be considered a second or third, passive, input. If the door 44 is open, the control will proceed to step S9 and turn off the saw 30, if the saw 30 is on. If the saw is already off, nothing will occur. Thus, if the door is open then the saw 30 cannot be engaged. If the door 44 is closed at step S2, the control can proceed to a machine arming step S3.

Third, in step S3, the control determines if the hydraulics are armed (if the machine is armed). The operator operates the hydraulic arming switch 54 (one example of third user input) in order to arm the machine. The hydraulic arming switch 54, alternatively, could be considered a second or fourth input. If the machine is not armed in step S3, the control will proceed to step S9 and turn off the saw 30, if the saw 30 is on. If the saw is already off, nothing will occur. Thus, if the door is open then the saw 30 cannot be engaged.

Thus, if the hydraulics are not armed then the saw 30 cannot be engaged. If the hydraulics are armed in step S3 the control can proceed to a saw switches step S4.

Fourth, in step S4, the control determines if the saw switches 56 have both been operated. The operator simultaneously operates the saw switches 56 (one example of a second user input) in order to operate the saw 30. The saw switches 56, alternatively, could be considered a third or fourth input. If the saw switches 56 are not both activated in step S4, the control will proceed to step S9 and turn off the saw 30, if the saw 30 is on. If the saw is already off, nothing will occur. Thus, if both saw switches 56 are not activated then the saw 30 cannot be engaged. If the saw switches 56 are both activated, the control can proceed to saw steps S5-S8.

Fifth, in step S5, the control determines if the saw button A has been pressed. If the saw button has not been pressed in step S5, the control proceeds to a saw ON step S7. In the saw ON step S7, the control determines if the saw 30 is ON or not. If the saw is ON at step S7, the control proceeds to step S9 turn OFF saw step. If the saw is not ON (saw is OFF) at step S7, the control proceeds to step S8 turn ON saw step. Thus, if the saw button A is pressed in step S5, the state of the saw 30 is changed, i.e., from off to on or from on to off. On the other hand, if the saw button is not pressed in step S5, the control proceeds to a saw ON step S6. In the saw ON step S6, the control determines if the saw 30 is ON or not. If the saw is ON at step S6, the control proceeds to step S8 turn on saw step. If the saw is not ON (saw is OFF) at step S6, the control proceeds to step S9 turn OFF saw step. Thus, if the saw button is not pressed in step S5 the state of the saw 30 is not changed. If the saw is turned on at step S8, power to the saw 30 is engaged by sending a control signal to the saw control valve 64. If the saw is turned off at step S9, power to the saw 30 is disengaged by sending a control signal to the saw control valve 64. After steps S8 and/or S9, the control ends. At the end of the control, after a predetermined time, e.g., for 100 milliseconds, the control will be repeated starting at step S2.

By the above control, after power has been engaged to the saw 30 by conditions of steps S2-S4 being met, the saw button A can be pressed again to disengage power to the saw 30 by sending a signal to the saw control valve 64. Specifically, if the steps S2-S4 remain in the yes condition state, the saw button A along can control turning off and turning on the saw 30. In addition to using the saw button A to turn off the saw 30, any of the other conditions in steps S2-S4 not being met will also result in turning off the saw 30.

In other words, there are several ways to stop the saw 30. One way is to turn saw off on the joystick button A (step S6). However, the saw 30 can be turned on again via the joystick button A (steps S5, S7, S9) in this situation if the conditions of steps S2-S4 are still met. Another way is to turn off either or both saw switches 56 (step S4). If either or both of the saw switches 56 are turned off, both saw switches and 56 are preferably reset to off (no) conditions so that the saw 30 cannot be turned on again until the switches 56 are both operated and then the saw button A is operated. Yet another way to turn off the saw 30 is to disarm the machine hydraulics by operating the hydraulic arming switch 54 (step S3). If the hydraulic arming switch 54 is turned off, both saw switches 56 are preferably reset to off (no) conditions so that the saw 30 cannot be turned on again until the hydraulic arming switch 54, both the switches 56 and then the saw button A are operated. And finally, another way to turn off the saw 30 is to open the operator cab door 44 (step S2). If the cab door 44 is opened, the door open/close detector 52 indicates the no condition (the door is open, or not closed). If the door open/close detector 52 indicates the door is open, the hydraulic arming switch 54, both saw switches 56 and the saw button A are preferably reset to off (no) conditions so that the saw 30 cannot be turned on again until the hydraulic arming switch 54, both the switches 56 and then the saw button A are operated.

One or more of the steps S2-S4 can be eliminated if needed and/or desired. However, preferably the control includes at least one of the steps S2-S4. More preferably, the control includes all of the steps S2-S4. As discussed below with reference to modifications, an additional step can be included in the control of FIG. 9. The additional step can be in addition to steps S2-S4 or instead of any one of the steps S2-S4 (e.g., instead of step S4).

To briefly review, in this embodiment, the forestry machine 10 includes a ground propulsion apparatus 12, a vehicle body 16 supported by the ground propulsion apparatus 12, an operator seat 46 disposed on the vehicle body 16, a first control joystick 48L or 48R operable by an operator sitting in the operator seat 46, a work implement 18 movably attached relative to the vehicle body 16, and a control circuit 40 including a first user input A-G disposed on the first control joystick 48L or 48R. The work implement 18 includes a saw 30. The first user input A-G is operatively coupled to the work implement 18 to engage and disengage power to the saw 30 in response to operation of the first user input A-G. The first user input A-G is inactive to turn on the saw 30 unless an activation signal has been received from a second user input. The second user input (saw switches 56) of the control circuit 40 are remote from the first control joystick 48L or 48R.

In addition, as explained above, the control circuit 40 and the first user input A-G are inoperative to turn on the saw 30 unless an arming signal has been received from a third user input (hydraulic arming switch 54), and the control circuit 40 and the first user input A-G are inoperative to turn on the saw 30 unless a passive signal has been received from a fourth passive input (door open/close detector 52). The cab 22 is supported on the vehicle body 16, the cab 22 having the door 44 openable to allow an operator to enter and exit the cab 22, and the fourth passive input is a door closed input (door open/close detector) that sends the passive signal when the door 44 is closed. The dashboard 50 is supported by the vehicle body 16, the second user input (saw switches 56) are disposed on the dashboard 50. Therefore, in this embodiment, the second user input includes a pair of manual inputs (pair of saw switches 56) that are both operated to send the activation signal.

In any case, the control circuit 40 includes a second input operatively coupled to the work implement 18 to engage and disengage power to the saw 30, and power to the saw 30 is engaged upon the first user input A and the second input both being operated. The second input may be disposed on the dashboard 50. In this case, the second input includes a pair of manual inputs (i.e., the saw switches 56), and power to the saw 30 is engaged upon the first user input A and both the manual inputs 56 being operated. In addition to or alternatively, the second input includes a passive input indirectly operable by the operator. The passive input is a door closed detector 52 that indicates whether the door 44 of the cab 22 of the forestry machine 10 is open or closed.

A method of operating the forestry machine 10 includes operating a first user input A disposed on the first control lever 48L or 48R, with power being engaged to and disengaged from the saw 30 in response to operation of the first user input. The method preferably includes operating a second user input to engage and disengage power to the saw 30, with power to the saw 30 being engaged upon the first user input and the second input both being operated. In the illustrated embodiment, the operating the second user input includes operating an input disposed on the dashboard 50 of the forestry machine 10. Preferably, the operating the second user input disposed on the dashboard 50 includes operating a pair of manual inputs 56. The operating the second user input may include operating a passive input indirectly operable by the operator. The operating the passive input includes operating a door closed detector 52 that indicates whether the door 44 of the cab 22 of the forestry machine 10 is open or closed.

The method further includes performing an arming operation in which a third user input (hydraulic arming switch 54) is operated. The activating operation and the saw operation are inoperative to engage the saw 30 unless the arming operating has been performed. The method further includes performing a passive operation in which a fourth passive input (door open/close detector 52) is passively operated. The activating operation and the saw operation are inoperative to engage the saw 30 unless the passive operating has been performed. The passive operation includes closing the door 44 that is openable to allow an operator to enter and exit a cab 22 of the forestry machine 10. The fourth passive input is a door closed input (door open/close detector 52) that sends the passive signal when the door 44 is closed.

First Modification

Without changing any structure above, different programming can be provided that allows the first user input (saw button A of the buttons/triggers A-G) alone to send the activation signal in addition to or instead of the saw switches 56. With this modification, the first user input A-G can be operated in a prescribed operating pattern to send an activation signal. In this modification, the prescribed operating pattern includes multiple operations of the first user input A-G within a predetermined time period to send the activation signal, or a prescribed spacing between operations of the first user input A-G. For example, a double clicking operation or triple clicking operation of the first user input A-G can send the activation signal. As another example of a prescribed operating pattern, the first user input A-G can be held for a predetermined time, e.g., for 2 seconds. The first user input A-G can be inactive unless this activation signal is received, or can be inactive unless an activation signal is received from the first user input A-G (from operation in the prescribed operating pattern) or from the second user input (saw switches 56). Likewise, the first user input A-G is deactivated upon receipt of a deactivation signal from the second user input and/or the first user input A-G. Therefore, in a modified method of operation, the operating the first user input A-G in the prescribed operating pattern sends the activation signal, and the prescribed operating pattern includes multiple operations of the first user input A-G within a predetermined time period. With this programming step S4 is modified to either have two possible ways to send the activation signal or the existing step S4 is replaced with this modification. Thus, in this modification, power to the saw 30 is engaged upon multiple operations of the first user input A within a predetermined time period being performed. The operating the first user input A includes multiple operations of the first user input A within a predetermined time period being performed to engage power to the saw 30.

Second Modification

Without changing any structure above, different programming can be provided that allows the first user input A-G to be inactive unless an activation signal has been received from the first user input A-G and an additional user input A-G of the control circuit 40. The additional user input A-G is disposed on the first control joystick 48L or 48R, and the first user input A-G and the additional user input A-G are both operated to send the activation signal. In other words, two buttons A-F on one of the joysticks 48L or 48R can be pressed together send the activation signal instead of or in addition to the activation signal of the first embodiment and/or the first modification. Thus, the first user input A-G can be deactivated upon receipt of a deactivation signal from the second user input and/or the additional user input A-G and/or the first user input in the prescribed operating pattern. As one example the buttons can be A and E. With this programming step S4 is modified to either have multiple possible ways to send the activation signal, or the existing step S4 is replaced with this modification. Thus, in this modification, the second input is disposed on the first control lever, and the first user input and the second input are disposed at different positions on the first control lever 48L. The operating the second user input includes operating an input E disposed on the first control lever 48L at a different position from the first user input A.

Third Modification

Without changing any structure above, different programming can be provided that allows the first user input A-G to be inactive unless an activation signal has been received from a second user input of the control circuit 40 remote from the first control joystick 48L or 48R (but not on the dashboard 50). In this modification, the second user input (buttons/triggers A-G) being disposed on the second control joystick 48R or 48L, and the first user input A-G and the second user input both are operated to send the activation signal. In other words, the first user input is disposed on one of the joysticks 48L or 48R, while the second user input is disposed on the other of the joysticks 48R or 48L. This second user input can be used in place of the second user input (saw switches 56) of the first embodiment or in combination therewith. Moreover, this second user input can e used in combination with either/both of the first and second modifications or without the first and second combinations. In this modification, the first user input A-G is deactivated upon receipt of a deactivation signal from the second user input, and optionally as described above in the first embodiment, first modification, and/or second modification. As one example the button A on the joystick 48L is a first user input and the button F on the control joystick 48R can be the second user input. With this programming step S4 is modified to either have multiple possible ways to send the activation signal, or the existing step S4 is replaced with this modification. Thus, in this modification, the second input is disposed on the second control lever. The operating the second user input includes operating an input A-G disposed on a second control lever 48R of the forestry machine 10.

Second Embodiment

Referring now to FIG. 10, a second embodiment will now be discussed briefly. This second embodiment is identical to the first embodiment, except a modified control circuit 140 that omits the machine controller 60 is utilized. In such a modified control circuit, the parts A, 52, 54 and 56 of the first embodiment can be simple electromechanical switches and an electrical line from the battery can be used to control the saw control valve 64. This embodiment is identical to the first embodiment, except as explained and illustrated herein.

The arrangements described and illustrated herein allow the high speed disc saw 30 to be easily toggled on and off from a programmed control joystick button (for example button A on joystick 48L), as long as certain conditions (for example of steps S2, S3 and S4) are met. This allows the operator's hands to not leave the control joysticks 48L and 48R any more than necessary, and for focus of the operator to remain on the machine operation. The arrangements described and illustrated herein also provide a sequence of operations prior to activating the saw to ensure the saw 30 is not inadvertently toggled on. Because of the arrangements disclosed herein, power to the saw 30 is engaged in response to multiple operations including operation of the first user input, and power to the saw is disengaged in response to a single operation.

Many parts of the work vehicle are conventional components that are well known in the work vehicle field. Since these components are well known in the work vehicle field, these structures will not be discussed or illustrated in detail herein, except as related to the disclosure set forth in the following claims.

As used herein, the following directional terms "forward, rearward, above, downward, vertical, horizontal, below and transverse" as well as any other similar directional terms refer to those directions of a work vehicle on a level surface. Accordingly, these terms, as utilized to describe the present disclosure should be interpreted relative to a work vehicle equipped with the present disclosure. The terms of degree such as "substantially", "about" and "approximately" as used herein mean a amount of deviation of the modified term such that the end result is not significantly changed.

While only selected embodiments have been chosen to illustrate the present invention, it will be apparent to those skilled in the work vehicle field from this disclosure that various changes and modifications can be made herein without departing from the scope of the invention as defined in the appended claims. Furthermore, the foregoing descriptions of the embodiments according to the present disclosure are provided for illustration only, and not for the purpose of limiting the invention as defined by the appended claims and their equivalents. Thus, the scope of the invention is not limited to the disclosed embodiments.

What is claimed is:

1. A forestry machine comprising:
   a ground propulsion apparatus;
   a vehicle body supported by the ground propulsion apparatus;
   an operator seat disposed on the vehicle body;
   a first control lever operable by an operator sitting in the operator seat;
   a work implement movably attached relative to the vehicle body, the work implement including a saw; and
   a control circuit including
      a first user input disposed on the first control lever, the first user input being operatively coupled to the work implement, and
      a second input operatively coupled to the work implement, the second input being disposed on the first control lever, and the first user input and the second input being disposed at different positions laterally spaced from each other on the first control lever, power to the saw being engaged upon the first user input and the second input both being operated.

2. The forestry machine according to claim 1, further comprising:
power to the saw is disengaged in response to a single operation.

3. A forestry machine comprising:
a ground propulsion apparatus;
a vehicle body supported by the ground propulsion apparatus;
an operator seat disposed on the vehicle body;
a first control lever operable by an operator sitting in the operator seat;
a work implement movably attached relative to the vehicle body, the work implement including a saw; and
a control circuit including
a first user input disposed on the first control lever, the first user input being operatively coupled to the work implement, and
a second input operatively coupled to the work implement, the second input including a pair of manual inputs,
power to the saw being engaged upon the first user input and both the manual inputs being operated; and
a dashboard supported by the vehicle body, the second input being disposed on the dashboard.

4. A forestry machine comprising:
a ground propulsion apparatus;
a vehicle body supported by the ground propulsion apparatus;
an operator seat disposed on the vehicle body;
a first control lever operable by an operator sitting in the operator seat;
a work implement movably attached relative to the vehicle body, the work implement including a saw;
a control circuit including
a first user input disposed on the first control lever, the first user input being operatively coupled to the work implement, and
a second input operatively coupled to the work implement,
power to the saw being engaged upon the first user input and the second input both being operated; and
a second control lever, the second input being disposed on the second control lever.

5. The forestry machine according to claim 4, wherein
power to the saw is disengaged in response to a single operation.

6. A forestry machine comprising:
a ground propulsion apparatus;
a vehicle body supported by the ground propulsion apparatus;
an operator seat disposed on the vehicle body;
a first control lever operable by an operator sitting in the operator seat;
a work implement movably attached relative to the vehicle body, the work implement including a saw; and
a control circuit including
a first user input disposed on the first control lever, the first user input being operatively coupled to the work implement, and
a second input operatively coupled to the work implement, the second input including a passive input indirectly operable by the operator,
power to the saw being engaged upon the first user input and the second input both being operated.

7. The forestry machine according to claim 6, further comprising:
a cab supported on the vehicle body, the cab having a door openable to allow the operator to enter and exit the cab, the passive input being a door closed detector.

8. The forestry machine according to claim 6, wherein
power to the saw is disengaged in response to a single operation.

9. A forestry machine comprising:
a ground propulsion apparatus;
a vehicle body supported by the ground propulsion apparatus;
an operator seat disposed on the vehicle body;
a first control lever operable by an operator sitting in the operator seat;
a work implement movably attached relative to the vehicle body, the work implement including a saw; and
a control circuit including a first user input disposed on the first control lever, the first user input being operatively coupled to the work implement to engage and disengage power to the saw in response to operation of the first user input,
power to the saw being engaged upon multiple identical movement operations of the first user input within a predetermined time period being performed.

10. The forestry machine according to claim 9, wherein
power to the saw is disengaged in response to a single operation.

11. A method of operating a forestry machine including a saw and a first control lever operable by an operator sitting in an operator seat, the method comprising:
operating a first user input disposed on the first control lever; and
operating a second user input, the operating the second user input including operating an input disposed on the first control lever at a different position laterally spaced from the first user input,
power being engaged to the saw in response to the first user input and the second input both being operated.

12. The method according to claim 11, further comprising performing a single operation to disengage power to the saw.

13. A method of operating a forestry machine including a saw and a first control lever operable by an operator sitting in an operator seat, the method comprising:
operating a first user input disposed on the first control lever; and
operating a second user input, the operating the second user input includes operating a pair of manual inputs disposed on a dashboard of the forestry machine,
power being engaged to the saw in response to the first user input and the second input both being operated.

14. A method of operating a forestry machine including a saw and a first control lever operable by an operator sitting in an operator seat, the method comprising:
operating a first user input disposed on the first control lever; and
operating a second user input, the operating the second user input including operating an input disposed on a second control lever of the forestry machine,
power being engaged to the saw in response to the first user input and the second input both being operated.

15. The method according to claim 14, further comprising performing a single operation to disengage power to the saw.

16. A method of operating a forestry machine including a saw and a first control lever operable by an operator sitting in an operator seat, the method comprising:
  operating a first user input disposed on the first control lever; and
  operating a second user input, the operating the second user input including operating a passive input indirectly operable by the operator,
  power being engaged to the saw in response to the first user input and the second input both being operated.

17. The method according to claim 16, wherein
  the operating the passive input includes operating a door closed detector that indicates whether a door of a cab of the forestry machine is open or closed.

18. The method according to claim 16, further comprising performing a single operation to disengage power to the saw.

19. A method of operating a forestry machine including a saw and a first control lever operable by an operator sitting in an operator seat, the method comprising:
  operating a first user input disposed on the first control lever,
  power being engaged to and disengaged from the saw in response to operation of the first user input, and
  the operating the first user input includes multiple identical movement operations of the first user input within a predetermined time period being performed to engage power to the saw.

20. The method according to claim 19, further comprising performing a single operation to disengage power to the saw.

\* \* \* \* \*